July 28, 1925.
W. F. RICHARDS
1,547,523
MACHINE FOR PASTING BATTERY GRIDS
Filed Nov. 5, 1921   3 Sheets-Sheet 2
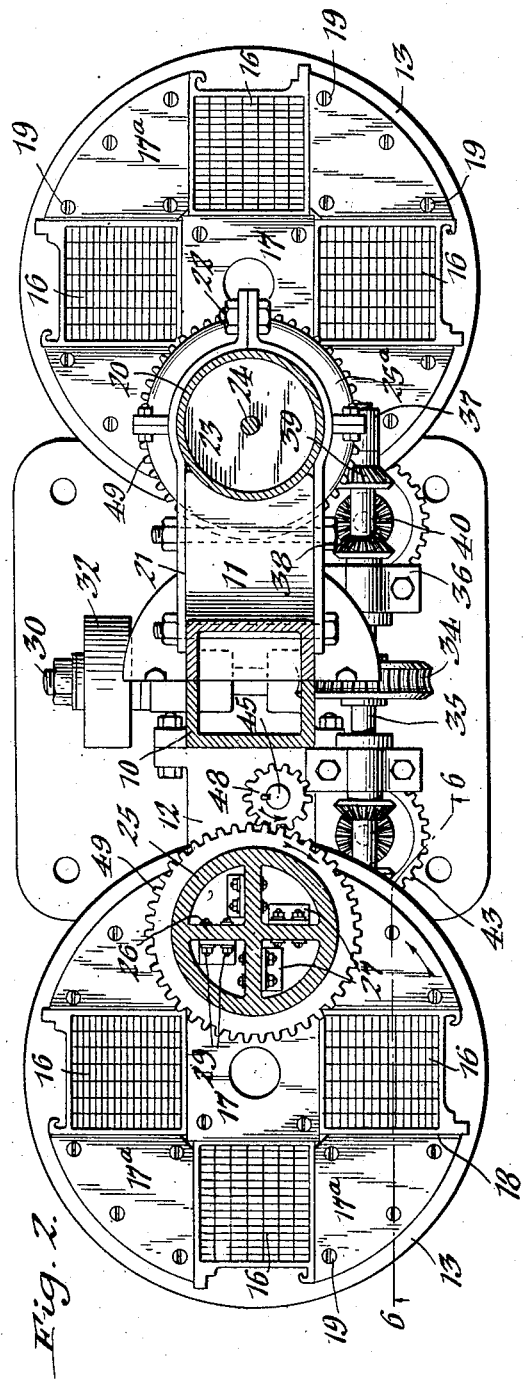
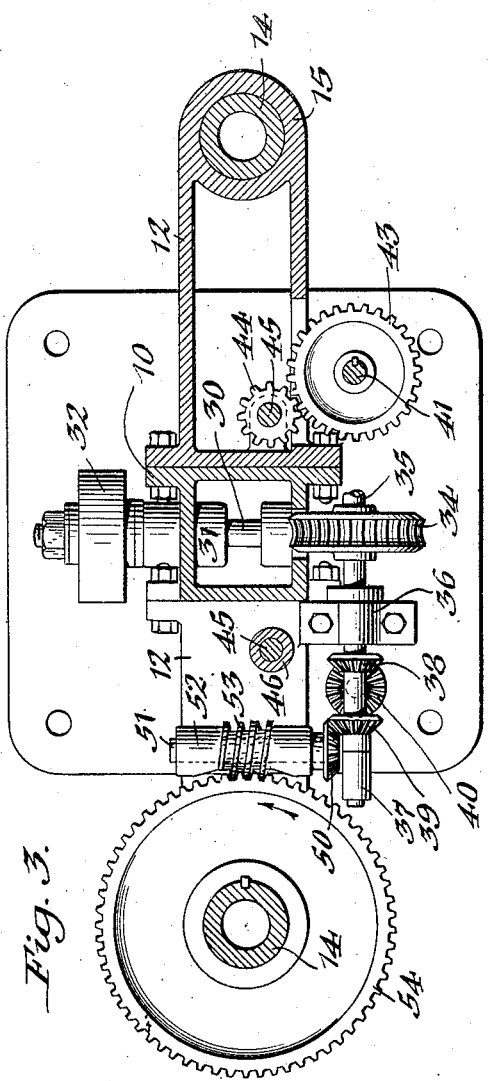

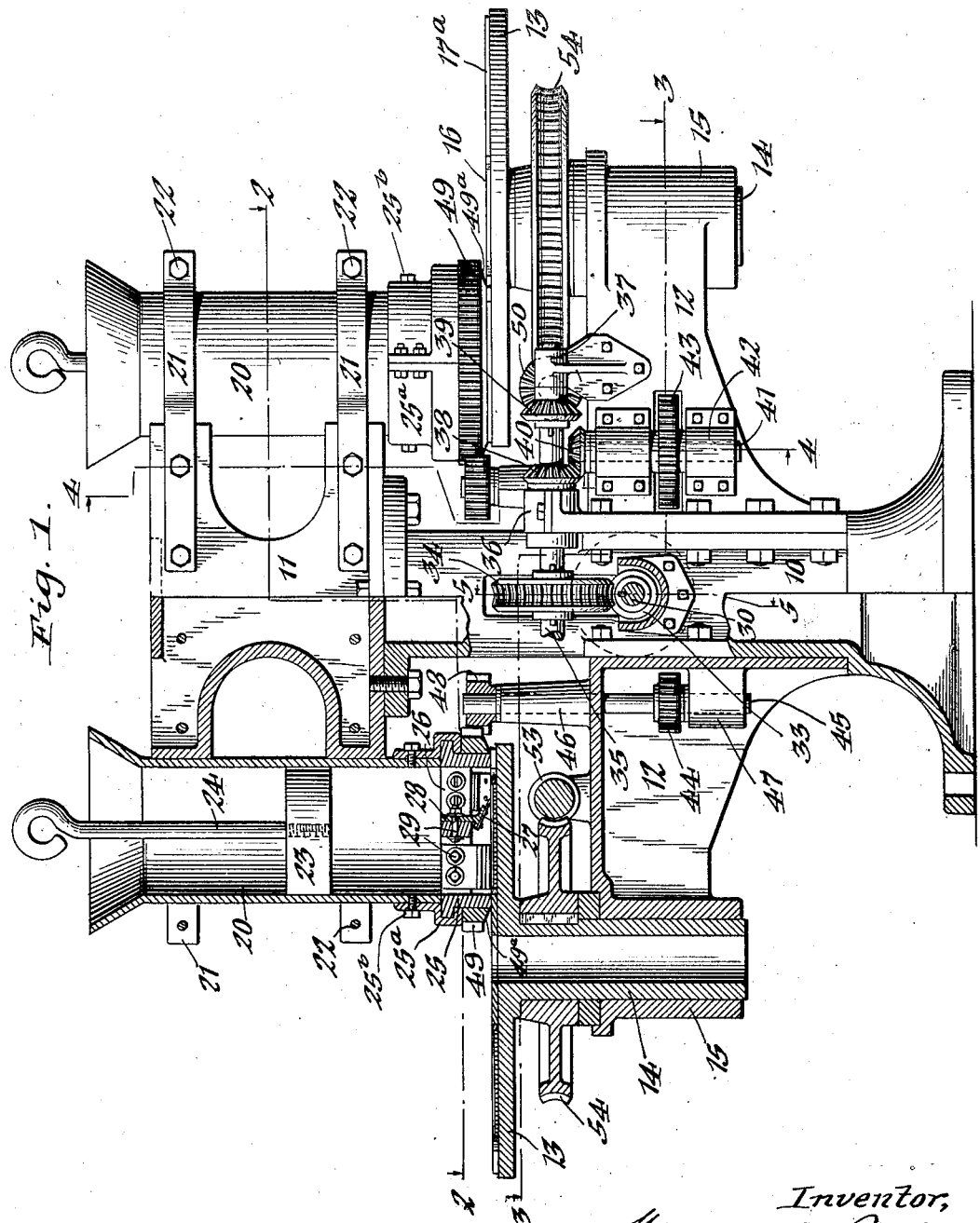

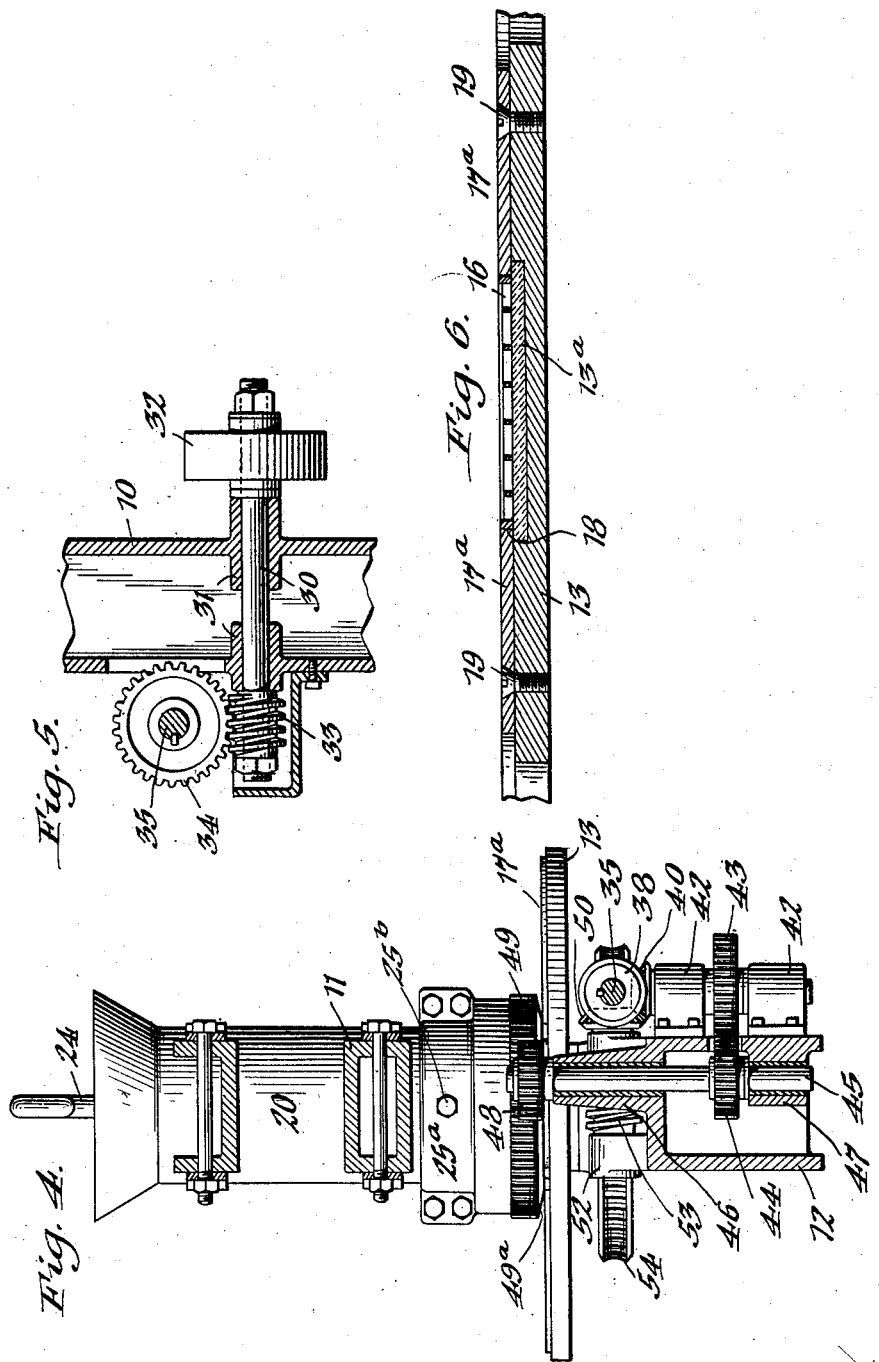

Patented July 28, 1925.

1,547,523

UNITED STATES PATENT OFFICE.

WILLARD F. RICHARDS, OF DEPEW, NEW YORK, ASSIGNOR TO GOULD STORAGE BATTERY COMPANY INCORPORATED, OF DEPEW, NEW YORK, A CORPORATION OF MARYLAND.

MACHINE FOR PASTING BATTERY GRIDS.

Application filed November 5, 1921. Serial No. 513,202.

*To all whom it may concern:*

Be it known that I, WILLARD F. RICHARDS, a citizen of the United States, residing at Depew, in the county of Erie and State of New York, have invented new and useful Improvements in Machines for Pasting Battery Grids, of which the following is a specification.

This invention relates to a machine for applying paste to the grids of storage batteries.

It is well known in this art that in order to obtain the most satisfactory results, the paste must be of proper and uniform density over the entire area of the battery grid. If the paste is packed too densely in the cells, the acid cannot act properly on all parts thereof, while if not dense enough, the paste falls out and the grid is short lived.

One of the objects of my invention is the provision of an efficient machine which shall paste all of the cells of the grid with equal density and at the same time smoothly finish the faces of the grid, so as to require no hand labor for this purpose.

A further object is to produce a compact machine having a comparatively large capacity.

In the accompanying drawings:

Figure 1 is a sectional side elevation of the improved machine. Figures 2 and 3 are horizontal sections thereof on the correspondingly numbered lines in Fig. 1. Figure 4 is a vertical transverse section on line 4—4, Fig. 1. Figure 5 is a fragmentary vertical transverse section on line 5—5, Fig. 1. Figure 6 is an enlarged fragmentary longitudinal section on line 6—6, Fig. 2.

Similar characters of reference indicate corresponding parts throughout the several views.

The main frame of the machine preferably comprises a standard or pedestal 10, a supporting head 11 bolted to the top thereof, and brackets or arms 12, 12, bolted or otherwise secured to opposite sides of said standard.

In its general organization, the machine comprises a rotatable table for carrying the battery grids; a feed chamber or receptacle for the paste disposed above the table; means for continuously feeding the paste onto the grids as the table is rotated, and a revolving device for pressing the paste compactly and uniformly into the cells or interstices of the grids. These mechanisms are duplicated in the machine shown in the drawings, being arranged on either side of the standard 10, and inasmuch as they are identical in construction, a description of one will apply to both.

13 represents the rotatable table having a depending spindle or stem 14 journaled in the bearing 15 carried by the corresponding bracket 12. Suitably held on the upper side of this table are the battery grids 16 of usual form which are arranged radially thereof. The preferred means for this purpose consist of a raised central spacer or plate 17 of rectangular form and a plurality of raised quadrantal space-plates 17$^a$ arranged radially at the corners of said central plate and forming intervening seats or recesses 18 for the reception of the battery grids, as shown in Figs. 2 and 6. These space-plates are removably secured to the table by screws 19 or other appropriate means and are flush with the grids, so as to form a smooth, continuous surface therewith and prevent the paste from being deposited between adjacent grids. For different sized grids, space-plates of correspondingly different sizes are employed.

As shown in Fig. 6, each grid preferably rests upon a slab 13$^a$ of glass, slate or similar material to which the paste will not adhere, this slab being suitably embedded in the table, with its face flush therewith.

Disposed vertically above the table 13 and preferably between its center and the standard 10 is the feed chamber or receptacle 20 for containing the lead oxide paste which is adapted to be applied under pressure to the battery grids. This feed chamber is preferably of cylindrical form and open at its upper and lower ends, the upper end serving as its filling opening and the lower end as its discharge opening. Any suitable means may be employed for supporting the feed chamber, but as shown in Figs. 1 and 2, it is embraced by upper and lower straps 21, 21 which are bolted or otherwise secured to the supporting head 11 of the machine. By loosening the clamping bolts 22 of these straps, the chamber may be adjusted vertically to adapt it to the varying thickness of different grids.

The means for continuously forcing or feeding the paste downwardly onto the grids may be of any appropriate form, but the preferred means shown comprise a weighted piston 23 guided in the feed chamber and provided with a rod 24 extending upwardly therefrom for removing it from the chamber when desired. In practice, a pressure of about eighty pounds has been found to produce satisfactory results. As the head or weight of the paste-mass diminishes in proportion to its consumption by the battery grids, additional weights may be placed on the rod 24 to compensate for such loss of pressure.

The device for uniformly filling and pressing the paste into the interstices of the grids is located at the discharge end of the feed chamber 20 and as shown in Figs. 1 and 2, preferably consists of a rotary horizontal head 25 journaled in a vertically-divided bearing or ring 25$^a$ removably secured to the lower end of said chamber by bolts 25$^b$, or other suitable means. This head is of annular form and its internal diameter is substantially the same as that of the bore of the feed chamber. Mounted on radial arms 26 of this head are a plurality of wipers, blades or trowels 27 which are inclined rearwardly and arranged to sweep over the surface of the grids, so as to wipe and press the paste into their cells and uniformly and compactly fill them and at the same time scrape off the surplus and smooth off the faces of the grids. As shown, these wipers are riveted or otherwise secured to suitable holders 28 removably attached to the cross arms by bolts 29. The wipers preferably consist of flexible steel blades, which are capable of adapting themselves to any unevenness of the grids and smooth the paste rather than tear it. These blades are vertically adjustable on the rotary head to suit grids of different thicknesses, being properly adjusted to exert the necessary pressure on the grids.

The table 13 and the wiper head 25 are rotated in opposite directions, as shown by the arrows in Fig. 2, and the speed of the wiper-head is preferably such that it makes about ten revolutions while a single grid travels past it.

The preferred means for simultaneously driving both sets of pasting mechanisms are constructed as follows:

30 represents the main driving shaft of the machine which is arranged transversely of the main frame and journaled in bearings 31 mounted on the standard 10. Secured to the rear end of this shaft is a pulley 32 which may be connected to any suitable source of power. A worm 33 keyed to the front end of said driving shaft meshes with a worm wheel 34 secured to a longitudinal driven shaft 35 journaled intermediate its ends in bearings 36, 36 and at its ends in bearings 37, 37. Secured to this driven shaft are two bevel gears 38 and 39, which indirectly transmit motion to the wiper head 25 and table 13, respectively. The bevel gear 38 meshes with a similar gear 40 mounted on the upper end of a vertical shaft 41 journaled in bearings 42, and a comparatively large spur gear 43, Fig. 3, secured to the lower end of said vertical shaft meshes with a smaller gear 44 mounted on the lower end of a vertical shaft 45 journaled in upper and lower bearings 46 and 47, respectively. A gear 48 secured to the upper end of the shaft 45 meshes with a gear rim 49 fixed to the wiper head 25. The gear rim is beveled on its underside, as shown at 49$^a$ to facilitate the passage of the rotary table and the grids under it.

The bevel gear 39 meshes with a similar gear 50 mounted on the front end of a transverse shaft 51 journaled in suitable bearings 52, said shaft carrying a worm 53 which meshes with a comparatively large worm wheel 54 keyed to the spindle 14 of the table 13. By these gear trains, each table is rotated at a comparatively slow speed in one direction while the corresponding wiper head 25 is rotated in the opposite direction at a speed which causes it to make about ten revolutions during the traverse of a single grid under it. While this speed ratio has given very satisfactory results, it may obviously be changed more or less without departing from the invention, as summed up in the appended claims.

The operation of this machine is as follows:

Assume the feed chambers 20 to be filled with paste and a set of grids 16 to be mounted on each of the tables 13. Power is now applied to the driving shaft 30 which transmits motion to the tables and wiper heads 25 in the direction indicated by the arrows. During the rotation of these parts, the paste is forced downwardly under the pressure of the weighted piston 23 onto the grids as they successively pass under the wipers, the paste being wiped and pressed into the cells of the grids by the wipers 27, which at the same time smooth and uniformly finish the surface of the filled cells, thus wholly dispensing with hand labor for this purpose. After pasting a set of grids, they are removed from the table, without stopping the machine and are replaced by another set of unpasted grids, the operation of the machine thus being continuous.

By this improved machine, a large number of grids are uniformly pasted in a relatively short period of time, effecting a considerable saving and correspondingly reducing the cost of production.

An important feature of the machine is the combination of the rotary wipers with the rotary grid supporting table, whereby all parts of the grids are wiped or pasted in various directions. For example, the wipers sweep in one direction over a given area of an advancing grid while it is on the rear side of the center of the wiper head, and sweep over such area in the opposite direction, after the same passes beyond that center. The result is that if the paste should be pulled or loosened by one of these wiper movements, it is compacted and smoothed by the opposite movement, insuring proper pasting of the grids with equal density over their entire area and from side to side thereof.

As the rotary wiper-head is supported and journaled at its periphery by means of the divided bearing ring 25ª, the use of a central supporting shaft in the paste receptacle 20 is avoided. This permits the cylinder and the wiper head to be cleaned with greater ease and thoroughness than if the cylinder contained such a shaft. This is done by removing the paste receptacles from the straps 21 and then disconnecting the wiper head from the receptacle by removing the divided ring 25ª.

I claim as my invention:

1. A machine for pasting battery grids, comprising a rotatable table having radially-disposed holding means for the grids, a paste feeding chamber disposed above said table and at one side of its axis, and rotatable means located at the discharge end of said chamber for pressing the paste into the cells of the grids, said paste-pressing means being rotatable in a direction opposite to that of said grid-holding table.

2. A machine for pasting battery grids, comprising a paste feeding chamber, a rotatable grid-carrying table arranged under the discharge end of said chamber, grid holding means arranged radially of said table to bring the grids successively into register with said chamber, and a rotary wiper-blade located at the discharge end of said chamber for pressing the paste into the grids.

3. A machine for pasting battery grids, comprising a paste feeding chamber, a rotatable grid-carrying table arranged under the discharge end of said chamber, and a rotary head arranged at the discharge end of said chamber, said head carrying flexible inclined wiper-blades for pressing the paste into the cells of the grids.

4. A machine for pasting battery grids, comprising a rotatable table having raised space plates thereon forming intervening seats for the grids, grid-supporting slabs arranged in said seats and constructed of a material to which the paste will not adhere, and a paste feeding chamber disposed above said table.

5. A machine for pasting battery grids, comprising a rotatable table having raised quadrantal plates spaced apart to receive grids between them, and a paste-feeding chamber disposed above said table.

6. A machine for pasting battery grids, comprising a support for the grids to be pasted, a paste receptacle disposed above said support for delivering the paste upon the grids, a bearing removably arranged at the discharge end of said receptacle, and a rotary device mounted in said bearing for pressing the paste into the grids.

7. A machine for pasting battery grids, comprising a support for the grids to be pasted, a paste receptacle disposed above said support for delivering the paste upon the grids, a divided bearing-ring removably arranged at the discharge end of said receptacle, and a rotary wiper head journaled at its periphery in said bearing-ring.

8. A machine for pasting battery grids, comprising a support for the grids to be pasted, a paste receptacle disposed above said support and delivering the paste upon the grids, a rotary head located at the discharge end of said receptacle and having a blade arranged to sweep over the grids placed on said support, said head having a gear-rim, and a driving gear meshing with said rim.

9. A machine for pasting battery grids, comprising a rotatable table for supporting the grids, a paste receptacle disposed above said table and delivering the paste upon the grids, a rotary wiper located at the discharge end of said receptacle, and means for rotating said table and said wiper at different speeds.

10. A machine for pasting battery grids, comprising a rotatable table for supporting the grids, a paste receptacle disposed above said table and delivering the paste upon the grids, a rotary wiper located at the discharge end of said receptacle, and means for rotating said table and said wiper in opposite directions and at different speeds.

WILLARD F. RICHARDS.